United States Patent [19]

Kohzai et al.

[11] 4,386,305
[45] May 31, 1983

[54] DRIVE CONTROL SYSTEM FOR MOTORS

[75] Inventors: Yoshinori Kohzai; Yoshiki Fujioka, both of Hino, Japan

[73] Assignee: Fujitsu Fanuc Limited, Tokyo, Japan

[21] Appl. No.: 201,314

[22] Filed: Oct. 27, 1980

[30] Foreign Application Priority Data

Nov. 12, 1979 [JP] Japan .................................. 54-146803

[51] Int. Cl.³ .............................................. G05B 19/25
[52] U.S. Cl. .................................... 318/571; 364/474; 318/39; 318/70
[58] Field of Search .................. 318/571, 39, 90, 92, 318/94, 77, 69, 70, 71; 364/474, 475, 105

[56] References Cited

U.S. PATENT DOCUMENTS

| 2,491,983 | 12/1949 | King et al. | 318/39 |
| 3,962,619 | 6/1976 | Nishimura et al. | 318/571 |
| 4,131,837 | 12/1978 | Whetham | 318/571 |
| 4,208,718 | 6/1980 | Chung | 364/474 |
| 4,237,408 | 12/1980 | Frecka | 318/571 |
| 4,279,013 | 7/1981 | Cameron et al. | 364/105 |

OTHER PUBLICATIONS

Control Engineering, vol. 11, No. 8, Aug. 1964, New York, (U.S.), R. Semi, "Numerically Controlled Miller Optimizes Own Production", pp. 93–95.
Product Eng., vol. 40, No. 16, Aug. 11, 1969, New York, (U.S.), "Simple Adaptive Control Reduces Tool Breakage", p. 74.

Primary Examiner—B. Dobeck
Assistant Examiner—A. Evans
Attorney, Agent, or Firm—Staas & Halsey

[57] ABSTRACT

A motor drive control system for use in a machine tool having spindle and feed shaft motors. If the spindle motor, which is rotating at a constant speed during a machining operation, is subjected to an overload, and consequently experiences a drop in speed, this fact is detected by a detector for detecting the armature current of the spindle motor. The feed shaft motor is slowed down to a predetermined speed if the overloaded condition continues for a prescribed period of time. The feed shaft motor is stopped if an even greater armature current is detected to be flowing due to a continuing overload despite the fact that the feed shaft motor has been slowed to the predetermined speed.

11 Claims, 7 Drawing Figures

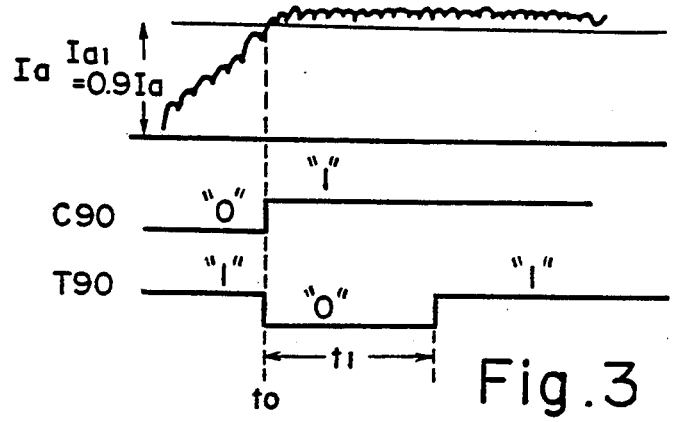
Fig. 2
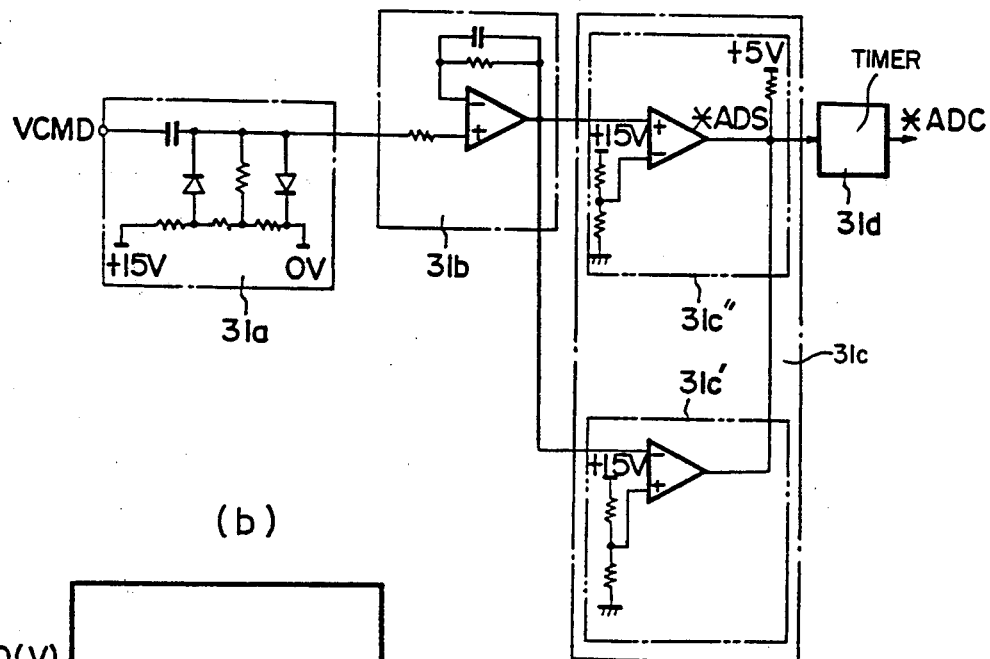
Fig. 3
(a)
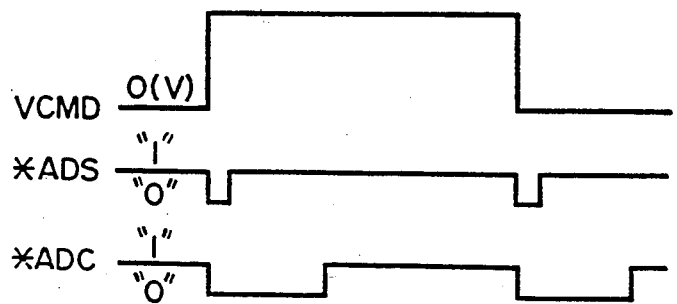
(b)

DRIVE CONTROL SYSTEM FOR MOTORS

BACKGROUND OF THE INVENTION

This invention relates to a system for controlling the manner in which a motor is driven, and more particularly to a motor drive control system which is capable of preventing tool breakage in a numerically controlled machine tool.

Numerically controlled machine tools to subject a workpiece to a prescribed machining operation by employing a spindle motor to rotate a tool and a feed shaft motor to move the workpiece relative to the tool, thereby allowing the tool to machine the workpiece in the prescribed manner. There are occasions where tools break or where cutting blades become chipped in the numerically controlled machine tools of the above type. This can be attributed to either of the following two causes: (1) stopping the spindle motor with the blade edge biting into the workpiece while being subjected to a heavy load, and then withdrawing the tool from the workpiece; or (2) withdrawing the tool from the workpiece when the spindle motor is about to stop or after it has stopped, following a continuation in machining under an excessive load in an intermittent machining operation. More specifically, there are cases where machining is performed in an intermittent manner while the magnitude of the load is fluctuating. In such a machining operation the cutting edge of the tool bites into and machines the workpiece for a predetermined period of time, after which the spindle motor speed is reduced until rotation of the motor stops. At this time, however, the feed shaft motor is still operating and continues to move the workpiece relative to the tool. This can cause tool breakage since the spindle motor is operating at a lower speed or is already at rest with the tool still thrust against the workpiece. Even if the tool should manage to escape damage when the spindle motor is reduced in speed or stopped, such damage will be unavoidable when the tool is withdrawn from the workpiece after the spindle motor is stopped.

SUMMARY OF THE INVENTION

Accordingly, it is an object of the present invention to provide a motor drive system which is capable of preventing tool breakage due to an overload.

It is another object of the present invention to provide a motor drive system which is capable of reducing the speed of a feed shaft motor for moving a workpiece, when the rotational speed of the spindle motor drops due to the development of an overload when machining is carried out while the spindle motor is rotating at a constant speed.

It is still another object of the present invention to provide a motor drive system which is capable of stopping a feed shaft motor for moving a workpiece, when the rotational speed of the spindle motor drops due to the development of an overload when machining is carried out while the spindle motor is rotating at a constant speed.

It is a further object of the present invention to provide a motor drive system which is capable of slowing down or stopping a feed shaft motor when a spindle motor continues to run at a reduced speed for a predetermined period of time due to the development of an overload in an instance where machining is to be carried out while the spindle shaft is rotating at a constant speed.

The motor drive control system of the present invention is employed in a numerically controlled machine tool of the type in which a spindle motor is driven to rotate a tool, while a feed shaft motor is operated to move a workpiece relative to the tool in such a manner that the workpiece is machined by the tool in a prescribed manner. To realize the foregoing objects, the system of the present invention includes means for detecting the armature current of the spindle motor, means for detecting that the armature current has continued to exceed a preset current value for a period of time greater than a predetermined period, and means for detecting acceleration or deceleration of the spindle motor. The arrangement is such that the feed shaft motor is slowed down or stopped when the armature current continues to exceed the preset current value for a period of time which is greater than the predetermined time period for a case in which there is no acceleration or deceleration of the spindle motor speed.

In accordance with another aspect of the present invention, the motor drive control system includes means for detecting the armature current of the spindle motor, first detection means for detecting that the armature current has continued to exceed a first set current value for a period of time greater than a predetermined period, second detection means for detecting that the armature current has continued to exceed a second set current value, which is larger than the first set current value, for a period of time greater than a predetermined period, and means for detecting acceleration or deceleration of the spindle motor. The feed shaft motor is slowed down to a predetermined value when the armature current continues to exceed the first set value for a period of time greater than the predetermined time period, and is stopped when the armature current continues to exceed the second set current value for a period of time greater than the predetermined time period.

Other features and advantages of the invention will be apparent from the following description taken in connection with the accompanying drawings.

BRIEF DESCRIPTION OF THE DRAWINGS

FIG. 2 is a waveform diagram for illustrating the principal portions of the circuit shown in FIG. 1;

FIG. 3(a) is a circuit diagram for detecting an increase or decrease in speed;

FIG. 3(b) is a waveform diagram for use in explaining the circuit of FIG. 3(a);

DESCRIPTION OF THE PREFERRED EMBODIMENT

Figure 1:
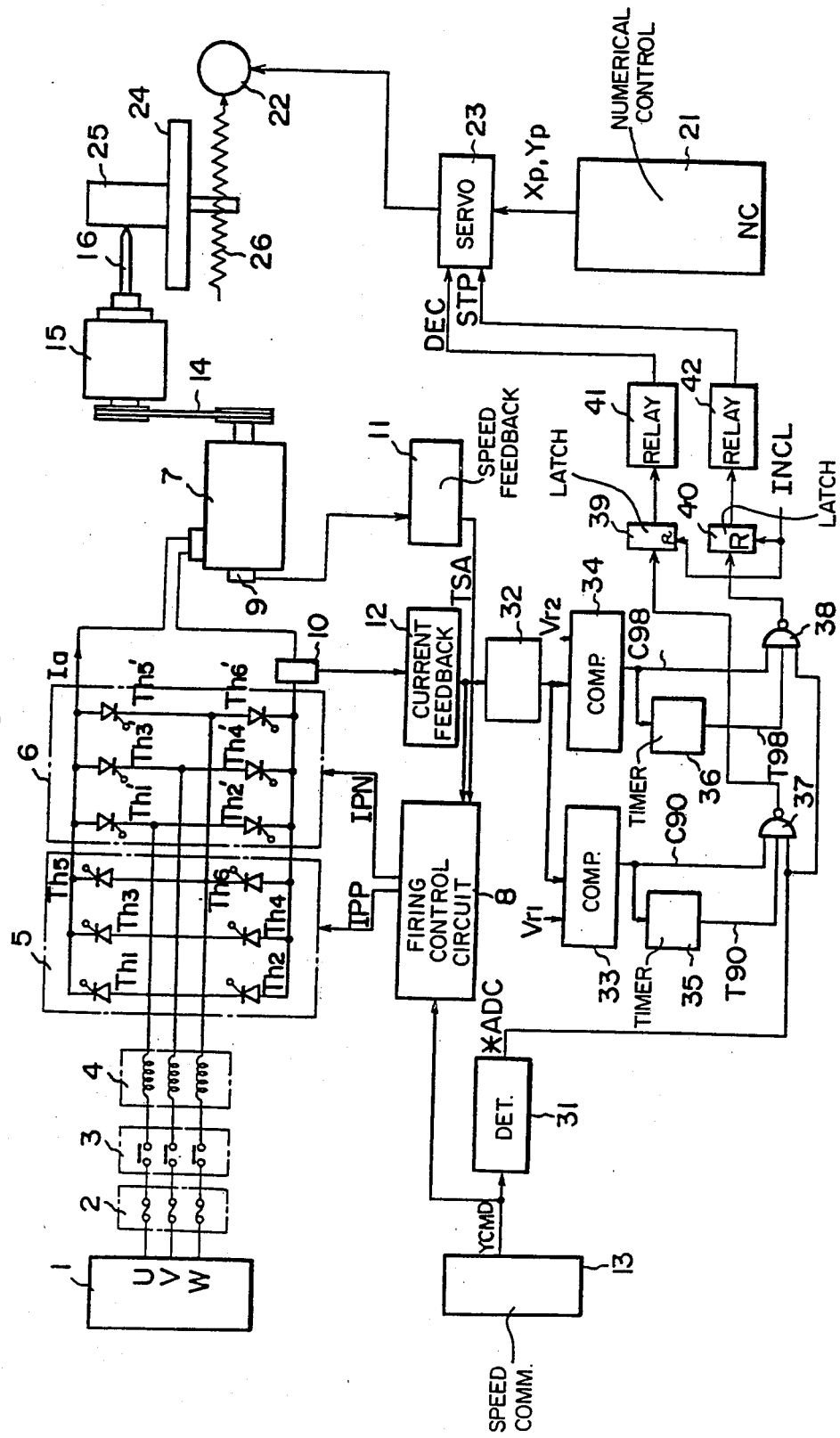
FIG. 1 is a circuit diagram of a motor drive control system according to the present invention.

A three-phase power supply 1 is connected to a forward or "positive" thyristor converter 5 and a reverse or "negative" thyristor converter 6 through fuses 2, a switching device 3 comprising electromagnetic contactors, and an AC reactor 4 for absorbing noise which is generated when the thyristors in the converters cummutate. The thyristor converters 5, 6 are adapted to drive a DC motor 7 for rotating a spindle, the motor 7 being referred to hereinafter as a spindle motor. A firing control circuit 8 is provided for controlling the firing angle of the converter thyristors. Mounted on the spindle motor 7 is a tachogenerator 9 for generating a voltage which is proportional to the rotational speed of the motor. The armature current $I_a$ of the spindle motor 7 is detected by means of a current detector 10 which may comprise a Hall device or the like. Connected between the tachogenerator 9 and the firing control circuit 8 is a speed feedback circuit 11 adapted to deliver a signal TSA indicative of the actual speed of the spindle motor 7. A current feedback circuit 12 processes the output of the current detector 10 and delivers a voltage $V_a$ in proportional to the armature current $I_a$. A speed command circuit 13 produces a speed command signal VCMD in response to which the speed of the spindle motor 7 is controlled. A tool 16 is mounted for rotation on a machine tool spindle 15 which is operatively coupled to the spindle motor 7 through a belt 14.

The positive thyristor converter 5 and negative thyristor converter 6 each include six thyristors $Th_1$ through $TH_6$ and $Th'_1$ through $Th'_6$, respectively the thyristor firing angle being controlled by the firing control circuit 8. The positive thyristor converter 5 converts the voltages $V_{UV}$, $V_{VW}$, $V_{WU}$ of the three-phase AC supply into DC voltage and supplies the spindle motor 7 with a forward armature current $I_a$. This is known as the forward conversion mode, wherein the spindle motor is rotated in the forward direction at a predetermined speed. The negative thyristor converter 6, on the other hand, converts the three-phase AC voltage into DC voltage to supply the spindle motor 7 with a reverse armature current $I_a$. This is known as the reverse conversion mode, wherein the spindle motor 7 is rotated in the reverse direction at a predetermined speed. The rotational speed of the spindle motor 7 can be varied by regulating the firing angle of each thyristor so as to change the voltage which is impressed upon the motor. To this end, the firing control circuit 8 advances or retards the thyristor firing angle in such a manner as to diminish to zero the deviation between the command speed VCMD and the actual speed TSA of the spindle motor 7. To accomplish this, the firing control circuit 8 generates firing pulses IPP or IPN at a predetermined timing, thereby controlling the firing of the thyristors $TH_1$ through $Th_6$ and $Th'_1$ through $Th'_6$. The firing control control circuit 8 constitutes a main loop for the speed control function described above, as well as a minor loop which prevent the armature current $I_a$ from exceeding a limiting value. The spindle motor 7 responds to the above-described control operation by rotating at the prescribed speed to drive the machine tool spindle 15 through the belt 14 (or a gear mechanism if preferred), the spindle 15 rotating the tool 16 at the commanded speed. A circuit for controlling the speed of a DC motor in the above manner is well-known in the art, as described, for example, in Chapter Five "The Dual-Converter" in Thyristor Phase-Controlled Converters and Cycloconverters by B. R. Pelly (Wiley-Interscience, John Wiley & Sons, U.S.A.).

A numerical control device 21 (referred to as "NC" hereinafter) executes operations such as a pulse distribution operation on the basis of a machining instruction received from input means such as a paper tape (not shown), and delivers distribution pulses Xp, Yp at a frequency which corresponds to the commanded feed speed. A DC motor 22 for the feed shaft, which motor will be referred to as a feed shaft motor hereinafter, may comprise a stepping motor or the like. A servo circuit 23 receives the distribution pulses Xp, Yp and controls the manner in which the feed shaft motor 22 is driven. A workpiece 25 is set upon a table 24 which is driven via a feed screw 26. Thus, the workpiece 25 placed upon the table 24 is transported at the commanded speed and along the commanded path in accordance with the machining instruction, and is machined by the tool 16 which is being rotatively driven in accordance with the instructions. It should be noted that the components so far described are similar to those employed in the conventional apparatus for numerical control of machine tools.

One feature of the present invention resides in a circuit 31 for detecting the status of a speed increase or decrease. The detection circuit 31, as illustrated in FIG. 3(a), includes a differentiation circuit 31a for differentiating the speed command VCMD; an amplification circuit 31b for amplifying the output of the differentiation circuit 31a; a discrimination circuit 31c for producing an acceleration-deceleration start signal ADS which goes to logic "0" when the amplitude of the output from the amplification circuit 31b is higher than a predetermined level; and a timer 31d for producing an acceleration-deceleration condition signal ADC which is held at logic "0" for a predetermined period of time which begins at the instant the acceleration-deceleration start signal ADS goes to logic "0". The discrimination circuit 31c has a comparator 31c' for ascertaining the size of the forward change in the speed command VCMD, and a comparator 31c'' for ascertaining the size of the reverse change in the speed command VCMD. The waveforms associated with the detection circuit 31 are shown in FIG. 3(b).

An absolute value circuit 32 receives the output of the current feedback circuit 12 and delivers an output signal which represents the absolute value of the armature current $I_a$. A first comparator 33 compares the output voltage (which is proportional to the armature current $I_a$) of the absolute value circuit 32 and a voltage value $Vr_1$ which corresponds to an armature current $I_{a1}$ that flows when the spindle motor 7 is operating under a 90% load, and produces a signal C90 which goes to logic "1" ($t_o$) when $I_a > I_{a1}$. A second comparator 34 compares the output voltage of the absolute value circuit 32 and a voltage value $Vr_2$ which corresponds to an armature current $I_{a2}$ that flows when the spindle motor 7 is operating under a 98% load, and produces a signal C98 which goes to logic "1" when $I_a > I_{a2}$. A timer 35 delivers a signal T90 which immediately goes to logic "0" when signal C90 goes to logic "1", and which reverts to logic "1" when the signal C90 has remained at logic "1" for a predetermined time period $t_1$. A timer 36 delivers a signal T98 which immediately goes to logic "0" when signal C98 goes to logic "1", and which reverts to logic "1" when the signal C98 has remained at logic "1" for a predetermined time period $t_2$, which is less than $t_1$. NAND gates 37, 38 have their outputs connected to respective latch circuits 39, 40. The latch circuits 39, 40 are reset to initial states by an initial clear signal INCL at the time of an initializing operation, and are held in the reset state when the outputs of the respective NAND gates 37, 38 are logic "1". When the NAND gate outputs go to logic "0", however, the latch circuits 39, 40 are set and generate signals that actuate respective relay circuits 41, 42. The relay circuits 41, 42 respond to the signals from the corresponding latch circuits 39, 40 by delivering a deceleration command signal DEC and a stop command signal STP, respectively. The deceleration command DEC slows the feed shaft motor 22 down to a speed which is 1/n times its former speed (where n is a positive number, e.g. 2), and the stop command STP causes the motor 22 to stop.

If an overload develops due to an increase in load acting upon the tool 16 when the acceleration-deceleration condition signal ADC is a "1", that is, when the spindle motor 7 is neither being accelerated nor decelerated, there is a decrease in the actual speed TSA of the spindle motor 7 and an increase in the armature current $I_a$. At time $t_0$, shown in FIG. 2, the armature current $I_a$ exceeds the first set current value $I_{a1}$ corresponding to the 90% load, with the result that the output signal C90 of the first comparator 33 goes to logic "1", sending the output signal T90 of the timer 35 to logic "0". If signal C90 remains at logic "1" for the predetermined time period $t_1$, which may have a duration of, say, 200 milliseconds, the output signal T90 of timer 35 is restored from "0" to "0". As a result, the output NAND gate 37 goes to logic "0" for the first time and is stored in latch circuit 39 which generates a signal that actuates a relay in the relay circuit 41. The latter responds by sending the deceleration command signal DEC to the servo circuit 23 of the feed shaft motor 22 which lowers the speed of the motor to 1/n of the former speed. Similarly, if the armature current $I_a$ continuously exceeds the second set current value $I_{a2}$ for a predetermined time period $t_2$, the second comparator 34, timer 36, NAND gate 38, latch circuit 40 and relay circuit 42 function to apply the stop command signal STP to the servo circuit 23 to stop the feed shaft motor 22.

If the armature current $I_a$ exceeds either of the first or second set current values for the predetermined time period when the signal ADC is at logical "0", that is, when the spindle motor 7 is being accelerated or decelerated, the outputs of the NAND gates 37, 38 remain at logical "1" so that the latches 39, 40 do not undergo a change in state. Accordingly, neither the deceleration command DEC nor the stop command STP is produced.

Though the deceleration command signal DEC and the stop command signal STP are applied to the servo circuit 23 in the present embodiment, it is also possible to send these signals to the numerical control device NC 21 and to adapt the NC 21 to reduce the pulse distribution operation speed to 1/n of the former speed or to zero, in accordance with these signals.

Figure 4:
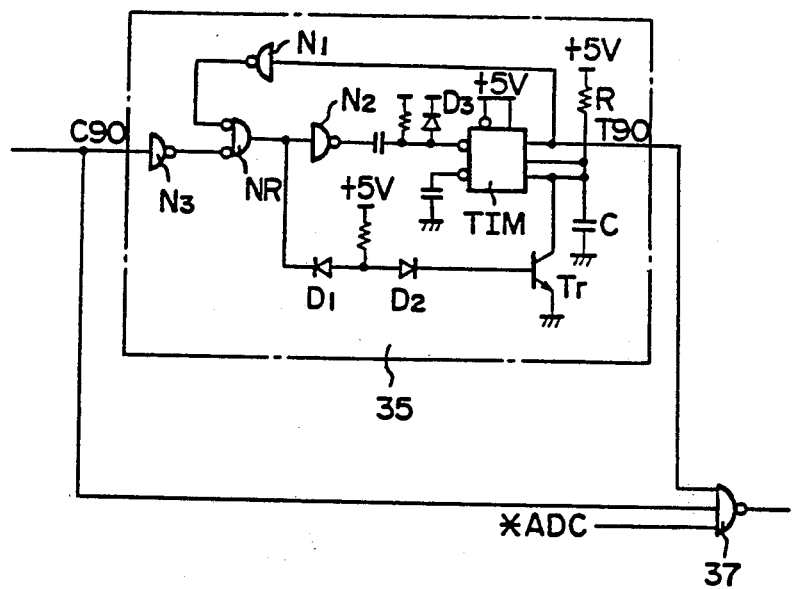
FIG. 4 is a circuit diagram of an embodiment of a timer.

An embodiment of the timer 35, which is structurally identical with timer 36, is shown in FIG. 4. The timer 35 includes NOT gates $N_1$, $N_3$, a NOR gate NR, a transistor Tr, diodes $D_1$ through $D_3$, and a widely available timer circuit TIM (NE555, product of Signetics, Inc.). The output C90 of comparator 33 is a logic "0" when the armature current $I_a$ is less than the set current value $I_{a1}$ which corresponds to the 90% load. Hence, NOR gate NR delivers an output at logic "0", and transistor Tr is non-conductive. A capacitor C consequently charges through a resistor R, so that the output signal T90 of timer 35 is at logic "1". If the armature current $I_a$ should exceed $I_{a1}$ under these conditions, signal C90 will go to logical "1", the output of NOR gate NR will go to logic "1", and transistor Tr will conduct, allowing the charge stored in capacitor C to discharge immediately through transistor Tr so that the output signal T90 goes to logic "0". When this occurs, the output of NOR gate NR reverts to logic "0", transistor Tr is cut off, and capacitor C charges again through the resistor R at a time constant RC. The charging of capacitor C is completed after a set time period, such as 200 milliseconds, whereupon signal T90 reverts to logic "1". If signal C90 is still a logic "1" ($I_a > I_{a1}$) at this time, the output of the NAND gate 37 goes to logic "0".

Figure 5:
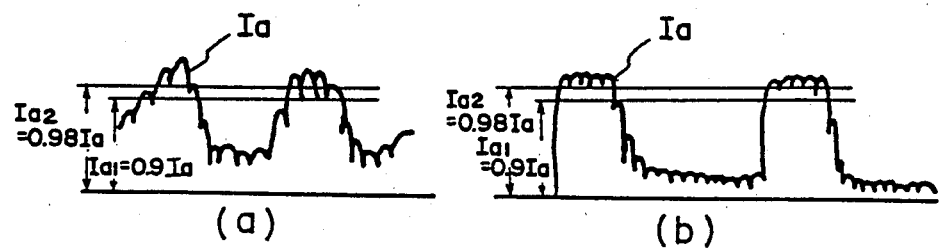
FIGS. 5(a) and 5(b) are waveform diagrams for illustrating the armature current when machining is performed under an intermittent load and when it is performed with peripheral speed held constant, respectively.

It should be noted that the operating times $t_1$, $t_2$, to which the timers 35, 36 are set, should be determined by considering such factors as the tool material and the conditions under which breakage might occur. More specifically, a set time which is too short lowers machining efficiency, while one which is too long invites tool breakage. Furthermore, there are occasions where the armature current $I_a$ exceeds the first and second set current values $I_{a1}$, $I_{a2}$ only momentarily, as shown in FIGS. 5(a) and 5(b), when machining is conducted under an intermittent load and when it is conducted at a constant peripheral speed, respectively. The intervals over which the current values $I_{a2}$, $I_{a1}$ are exceeded are less than 200 milliseconds long in the case of the intermittent load and less than 300 milliseconds long in the case of the constant peripheral speed. These intervals are not long enough to allow tool breakage. Thus, all of these factors should be considered when determining the timer operating intervals $t_1$, $t_2$.

In accordance with the present invention as described above, the occurrence of an overload is detected by monitoring armature current. Continuation of the overloaded condition beyond a predetermined time period is also detected. This feature permits the feed shaft motor to be slowed down or stopped before the spindle shaft motor incurs a marked drop in speed or before it stops. In other words, the feed shaft motor is slowed down or stopped to alleviate the cutting load acting upon the tool when the tool is still capable of performing a degree of cutting work. This prevents the tool from biting into the workpiece at the end of a machining operation, and therefore precludes breakage of the tool when it is withdrawn from the workpiece or when the spindle motor is slowed down or stopped. This has the result of enhancing machining performance.

Although the present invention has been described in its preferred form with a certain degree of particularly, it is obvious that many modifications and variations are possible in the light of the above teachings. It is therefore to be understood that, within the scope of the appended claims, the invention may be practiced otherwise than as specifically described.

What we claim is:

1. A system for controlling motor drive in a numerically controlled machine tool having speed command means for generating a speed command signal, a spindle motor, operatively connected to the speed command means, driven to rotate a tool in accordance with the speed command signal, a numerical control device for generating a feed command signal, and a feed shaft motor, operatively connected to the numerical control device, driven to transport a workpiece relative to the tool in accordance with the feed command signal, so that the tool may subject the workpiece to a predetermined machining operation, said system comprising:
   first detection means, operatively connected to the spindle motor, for detecting the armature current of the spindle motor;
   second detection means, operatively connected to said first detection means, for detecting when the armature current of the spindle motor has continuously exceeded a preset current value for a period of time greater than a predetermined time period;

third detection means for detecting an acceleration or deceleration condition of the spindle motor in dependence upon the speed command signal; and means, operatively connected to said second and third detection means and the feed shaft motor, for slowing down the feed shaft motor when said second detection means detects that the armature current of the spindle motor has continuously exceeded the preset current value for a period of time greater than the predetermined time period under a condition in which the spindle motor is neither being accelerated nor decelerated, as detected by said third detection means.

2. The system according to claim 1, wherein said third detection means comprises:

a differentiation circuit for differentiating the speed command signal for the spindle motor to obtain an output signal;

a discrimination circuit, operatively connected to said differentiation circuit, for ascertaining whether the amplitude of the output signal of said differentiation circuit is higher than a predetermined level; and a timer, operatively connected to said discrimination circuit, for producing an acceleration-deceleration condition signal having a constant duration beginning when the amplitude of the output signal of said discrimination circuit exceeds the predetermined level.

3. A system for controlling motor drive in a numerically controlled machine tool having speed command means for generating a speed command signal, a spindle motor, operatively connected to the speed command means, driven to rotate a tool in accordance with the speed command signal, a numerical control device for generating a feed command signal, and a feed shaft motor, operatively connected to the numerical control device, driven to transport a workpiece relative to the tool in accordance with the feed command signal, so that the tool may subject the workpiece to a predetermined machining operation, said system comprising:

first detection means, operatively connected to the spindle motor, for detecting the armature current of the spindle motor;

second detection means, operatively connected to said first detection means, for detecting when the armature current of the spindle motor has continuously exceeded a preset current value for a period of time greater than a predetermined time period;

third detection means for detecting an acceleration or deceleration condition of the spindle motor in dependence upon the speed command signal; and means, operatively connected to said second and third detection means and the feed shaft motor, for stopping the feed shaft motor when said second detection means detects that the armature current of the spindle motor has continuously exceeded the preset current value for a period of time greater than the predetermined time period under a condition in which the spindle motor is neither being accelerated nor decelerated, as detected by said third detection means.

4. The system according to claim 3, wherein said third detection means comprises:

a differentiation circuit for differentiating the speed command signal for the spindle motor to obtain an output signal;

a discrimination circuit, operatively connected to said differentiation circuit, for ascertaining whether the amplitude of the output signal of said differentiation circuit is higher than a predetermined level; and a timer, operatively connected to said discrimination circuit, for producing an acceleration-deceleration condition signal having a constant duration beginning when the amplitude of the output signal exceeds said predetermined level.

5. A system for controlling motor drive in a numerically controlling machine tool having speed command means for generating a speed command signal, a spindle motor, operatively connected to the speed command means, driven to rotate a tool in accordance with the speed command signal, a numerical control device for generating a feed command signal, and a feed shaft motor, operatively connected to the numerical control device, driven to transport a workpiece relative to the tool in accordance with the feed command signal, so that the tool may subject the workpiece to a predetermined machining operation, said system comprising:

first detection means, operatively connected to the spindle motor, for detecting the armature current of the spindle motor;

second detection means, operatively connected to said first detection means, for detecting when the armature current of the spindle motor has continuously exceeded a first preset current value for a period of time greater than a first predetermined time period;

third detection means, operatively connected to said first detection means, for detecting that the armature current of the spindle motor has continuously exceeded a second preset current value, which is greater than the first preset current value, for a period of time greater than the first predetermined time period;

fourth detection means for detecting an acceleration or deceleration condition of the spindle motor in dependence upon the speed command signal; and means, operatively connected to said second, third and fourth detection means and the feed shaft motor, for slowing the feed shaft motor down to a predetermined speed when said second detection means detects that the armature current of the spindle motor has continuously exceeded the first preset current value for a period of time greater than the first predetermined time period, and for stopping the feed shaft motor when said third detection means detects that the armature current of the spindle motor has continuously exceeded the second preset current value for a period of time greater than a second predetermined time period.

6. The system according to claim 5, wherein said fourth detection means comprises:

a differentiation circuit for differentiating the speed command signal for the spindle motor to obtain an output signal;

a discrimination circuit, operatively connected to said differentiation circuit, for ascertaining whether the amplitude of the output signal of said differentiation circuit is higher than a predetermined level; and a timer, operatively connected to said discrimination circuit, for producing an acceleration-deceleration condition signal having a constant duration beginning when the amplitude of the output signal exceeds the predetermined level.

7. A system for controlling motor drive in a numerically controlled machine tool having speed command means for generating a speed command signal, a spindle motor, operatively connected to the speed command means, driven to rotate a tool in accordance with the speed command signal, a numerical control device for generating a feed command signal, and a feed shaft motor, operatively connected to the numerical control device, driven to transport a workpiece relative to the tool in accordance with the feed command signal, so that the tool may subject the workpiece to a predetermined machining operation, said system comprising:

first detection means, operatively connected to the spindle motor, for detecting the armature current of the spindle motor and for generating an armature current signal;

second detection means for detecting an acceleration or deceleration condition of the spindle motor in dependence upon the speed command signal and for generating an acceleration-deceleration condition signal;

first commparison means, operatively connected to said first and second detection means, for comparing the value of the armature current signal to a first preset current value and for generating a deceleration command signal when the value for the armature current signal has continuously exceeded the first preset value for a predetermined time period in dependence upon the acceleration-deceleration condition signal; and control means, operatively connected to said first comparison means, for decelerating the feed shaft motor in dependence upon said deceleration command signal.

8. A system as set forth in claim 7, further comprising second comparison means, operatively connected to said first and second detection means, for comprising the value of the armature current signal to a second preset current value and for generating a stop command signal when the value of the armature current signal has continuously exceeded the second preset current value for the predetermined time period, in dependence upon the acceleration-deceleration condition signal.

9. A system as set forth in claim 7 or 8, wherein said second detection means comprises:

a differentiation circuit for differentiating the speed command signal and for providing, as an output, a differentiation signal;

a discrimination circuit, operatively connected to said differentiation circuit, for comparing the amplitude of the differentiation signal to a predetermined level and for generating an acceleration-deceleration start signal when the amplitude of the differentiation signal exceeds the predetermined level; and a first timer circuit, operatively connected to said discrimination circuit, for receiving the acceleration-deceleration start signal and for generating the acceleration-deceleration condition signal having a constant duration.

10. A system as set forth in claim 9, wherein said first comparison means comprises:

a comparator circuit, operatively connected to said first detection means, for comparing the value of the armature current signal to the first preset current value and for generating a comparison signal;

a second timer circuit, operatively connected to said comparator circuit, for generating a timing signal in dependence upon said comparison signal; and an AND gate, operatively connected to said comparator circuit, said first timer circuit and said second timer circuit, for generating the deceleration command signal in dependence upon the acceleration-deceleration condition signal, the timing signal and the comparison signal.

11. A system as set forth in claim 10, wherein said control means comprises a servo circuit.

* * * * *

UNITED STATES PATENT AND TRADEMARK OFFICE
CERTIFICATE OF CORRECTION

PATENT NO. : 4,386,305
DATED : MAY 31, 1983
INVENTOR(S) : YOSHINORI KOHZAI ET AL.

It is certified that error appears in the above-identified patent and that said Letters Patent is hereby corrected as shown below:

```
Col. 2, line 68, "cum-" should be --com- --.
Col. 3, line 16, "proportional" should be --proportion--;
        line 68, after "shown)", delete ",".

Col. 5, line 23, " "0" to "0" " should be --"0" to "1"--.

line 66, "and transistor . . ." to Col. 6, line 1,
                 "logic" should not be in heavy typeface.
```

Signed and Sealed this

Seventh Day of February 1984

[SEAL]

Attest:

Attesting Officer

GERALD J. MOSSINGHOFF
Commissioner of Patents and Trademarks